S. FERREIRA.
SCALE.
APPLICATION FILED OCT. 19, 1915. RENEWED FEB. 2, 1918.
1,260,529.
Patented Mar. 26, 1918.
2 SHEETS—SHEET 1.
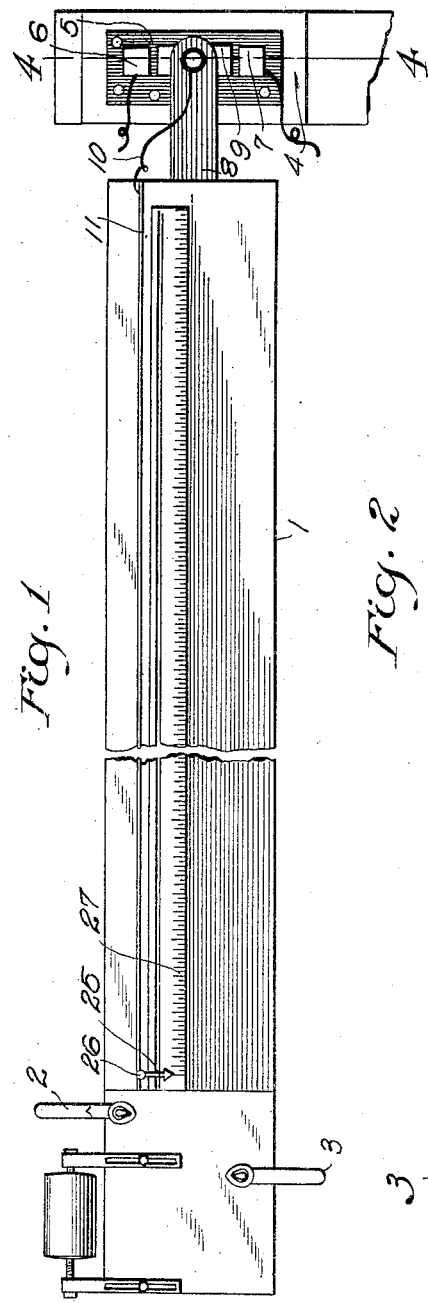
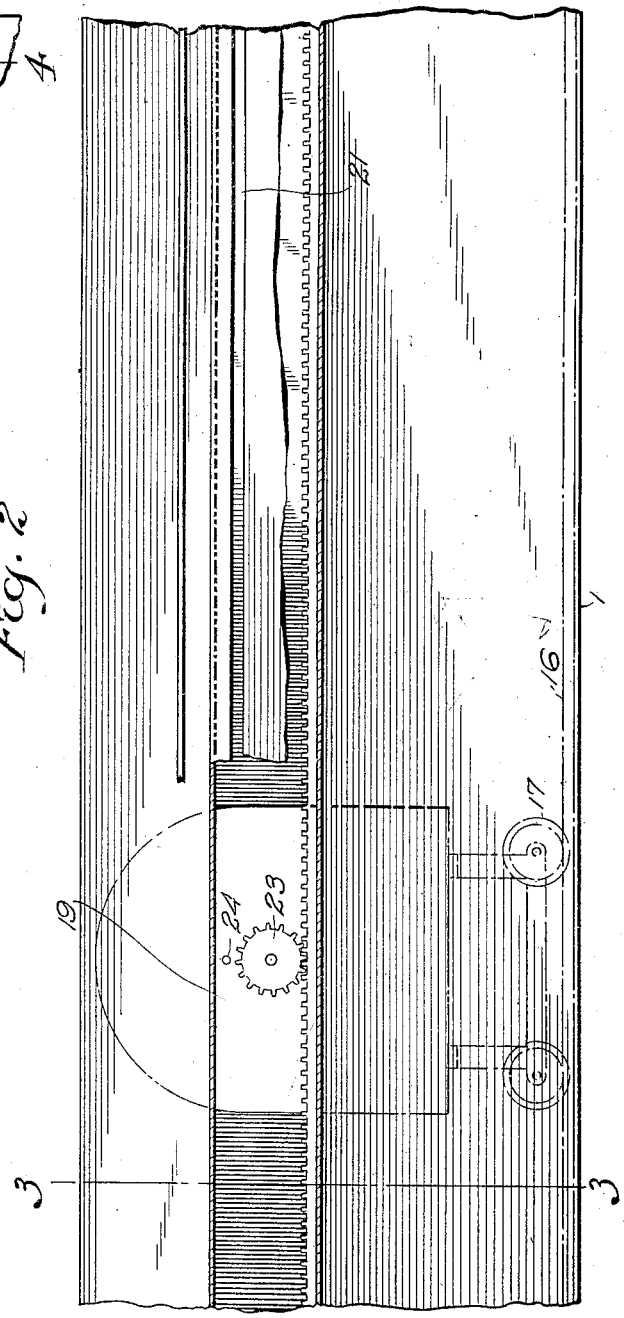
WITNESSES
INVENTOR
S. Ferreira
BY
ATTORNEYS

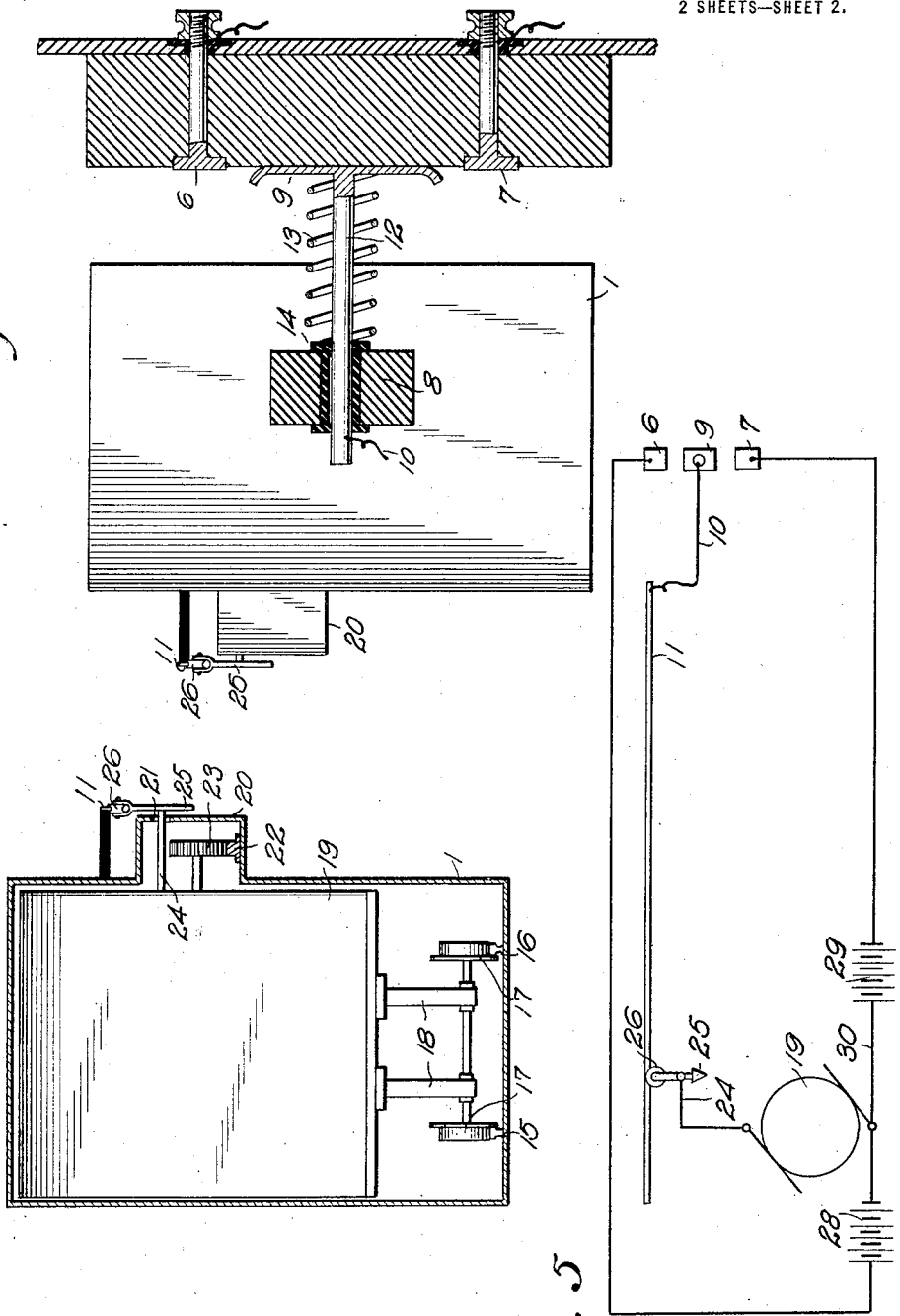

UNITED STATES PATENT OFFICE.

SYLVESTER FERREIRA, OF HONOLULU, TERRITORY OF HAWAII.

SCALE.

1,260,529.  Specification of Letters Patent.  Patented Mar. 26, 1918.

Application filed October 19, 1915, Serial No. 56,669. Renewed February 2, 1918. Serial No. 215,223.

*To all whom it may concern:*

Be it known that I, SYLVESTER FERREIRA, a citizen of the United States, and a resident of Honolulu, in the county of Honolulu and Territory of Hawaii, have invented a new and Improved Scale, of which the following is a full, clear, and exact description.

This invention relates to scales and particularly to an improved arrangement whereby the scales will automatically show the correct weight of anything placed on the platform, and has for an object the provision of an improved arrangement for quickly and accurately adjusting the weight on the scale beam to cause the same to balance properly.

Another object in view is to provide an improved arrangement on a scale beam for automatically moving the weight either outwardly or inwardly according to the weight on the platform scale.

A further object of the invention is to provide a scale beam with a traveling motor arranged thereon and acting as a weight, together with a switching mechanism operated by the beam and a suitable electric circuit whereby current is turned on to the motor for driving the same in either direction according to the position of the scale beam.

In the accompanying drawings:—

Figure 1 is a side view of a scale beam and associated parts embodying the invention;

Fig. 2 is a longitudinal vertical section through part of the beam shown in Fig. 1, the same being on an enlarged scale for illustrating how the motor is moved along the beam;

Fig. 3 is a transverse section through Fig. 2 on line 3—3;

Fig. 4 is a section through Fig. 1 approximately on line 4—4, the same being on an enlarged scale;

Fig. 5 is a diagram showing the circuit of the switch or contact blocks and the motor.

Referring to the accompanying drawings by numerals, 1 indicates a scale beam which may be supported by suitable members 2 and 3 in the usual manner, member 3 being connected with a platform, not shown. Adjacent the outer end of beam 2 is a member 4 which may be known as a keeper. To member 4 is secured an insulating member 5 carrying posts 6 and 7. The beam 1 is provided with an extension 8 carrying a transverse bar 9 adapted to engage either of the posts 6 or 7 according to whether or not the beam has been tilted up or moved downwardly. The posts 6 and 7 are charged with current of different polarity so that whenever the bar 9 engages either of these posts the current or polarity of the posts will pass on to the wire 10 and from thence on to rod 11, rod 11 and wire 10 together with bar 9 being insulated from the beam 1 and extension 8. If desired the extension 8 could be made from insulating material, though ordinarily the same is a metal extension carrying the cross bar 9 which is insulated therefrom in any suitable manner. As shown in Fig. 4 the cross bar 9 may be provided with a stem 12 surrounded by a spring 13. The spring 13 is intended to bear against the insulating spool 14 and against the bar 9 for resiliently holding the bar against member 5 so that the bar 9 may engage either of the posts 6 or 7 whenever brought opposite the same.

The beam 1 is made hollow, as shown in Fig. 3, and is provided with tracks 15 and 16 on which the various wheels 17 move, said wheels carrying a suitable upright structure 18 which in turn carries the motor 19, said motor being of any desired construction. The beam 1 is provided with an offset hollow section 20 which is formed with a slot 21 and provided with a rack 22. The armature of motor 19 has a gear wheel 23 rigidly connected therewith and meshing with rack 22 so that when the motor is operated the gear wheel acting on rack 22 will force the motor along the beam. A bar 24 is connected with motor 19 in any suitable manner so as to conduct current to the motor, said bar extending through slot 21. A pointer 25 is rigidly connected with bar 24, said pointer carrying in its upper end a roller 26 engaging the bar 11 so as to receive current therefrom. The pointer 25 is adapted to move over a scale 27, which scale is of the usual marking for indicating the weight of articles on the device.

In operation, when the scale is not in use the beam 1 and associated parts assume the position shown in Fig. 1 so that the bar 9 will be positioned between the posts 6 and 7 and out of contact therewith. If a given weight is placed on the platform scale beam 1 will immediately move upwardly until the bar 9 is in engagement with the post 6, whereupon current will pass from post 6 to bar 9 and from thence over wire 10 to the bar or rod 11. From the rod 11 the current will pass to pointer 25 and from thence to the motor 19, where it is grounded or provided with a common return to the source of supply. This will cause the motor 19 to operate and move along the beam 1 until the beam has been overbalanced sufficiently for moving the parts to the position shown in Fig. 1, whereupon the circuit will be broken by bar 9 moving off of the post 6. If for any reason part of the weight is now removed from the platform the outer end of the beam will immediately move downwardly until the bar 9 engages post 7, whereupon the rod or bar 11 will be charged with current of different polarity, thus reversing the motor so that the same will move in a reverse direction to its first movement until the beam rises and breaks the circuit at post 7. This action is repeated when the entire weight is removed.

It is evident that any suitable source of current may be provided, the same being connected preferably as shown in the outline in Fig. 5 where the batteries 28 and 29 are connected together by wire 30 and the opposite ends connected to the posts 6 and 7. The common return of the motor 19 is connected to wire 30 between the batteries. It will be observed that the current is always turned on so that the motor will automatically actuate whenever the weight on the platform of the scale is varied or removed. No current, however, is flowing except during the movement of the motor from one position of the beam to the other, as the current is automatically switched off the motor by the shifting of the position of the motor itself.

What I claim is:—

1. In a scale of the character described, a hollow beam provided with a slot and graduations adjacent said slot, an electric motor arranged in said beam, a pointer adapted to travel over said graduations, means for connecting said pointer with said motor, and means for reversing the current in said motor for causing the motor to travel in either direction, said means including a switching mechanism connected with the beam and closed as the beam moves upwardly or moves downwardly from substantially a central position.

2. In a scale of the character described, a beam formed hollow and provided with an extension at one end, a contact bar mounted on said extension, a pair of contact posts spaced respectively above and below said contact bar and arranged to be brought in contact therewith as said beam moves upwardly or downwardly from a central horizontal position, an electric motor arranged in said beam, means for connecting said electric motor with said contact bar, and a pointer connecting said motor for indicating the position thereof on said beam.

3. In a scale of the character described, a beam provided with graduations, an insulated bar mounted on said beam, an electric motor mounted on said beam, a pointer provided with a contact member and a head, said head being adapted to move over said graduations and said contact member being adapted to engage said insulated bar, means for connecting said pointer with said motor for conducting electric current to the motor, and means for switching current of different polarity on to said insulated bar according to the position of said beam so as to operate the motor in different directions, the motor operating in one direction traveling outwardly until the beam is caused to balance and when operated in the opposite direction traveling inwardly until the beam is caused to balance.

4. In a scale of the character described, a beam provided with graduations thereon, said beam being hollow, a rack arranged in said beam, an electric motor mounted on said beam, a pinion connected to the shaft of said motor and arranged to mesh with said rack, a pointer provided with a contact member and a head, said head being adapted to move over said graduations, means for connecting the pointer with the motor for conducting electric current to the motor, an insulated bar mounted on said beam and engaging said contact, and means for switching current of different polarity on said insulated bar according to the position of the beam so as to operate the motor in different directions, the motor operating in one direction traveling outwardly until the beam is caused to balance and when operated in the opposite direction traveling inwardly until the beam is caused to balance.

In testimony whereof I have signed my name to this specification in the presence of two subscribing witnesses.

SYLVESTER FERREIRA.

Witnesses:
 HUGH J. DUFFY,
 OSCAR J. PHILLIPS.

Copies of this patent may be obtained for five cents each, by addressing the "Commissioner of Patents, Washington, D. C."